United States Patent
Ito et al.

(10) Patent No.: US 10,697,494 B2
(45) Date of Patent: Jun. 30, 2020

(54) SINTERED BEARING

(71) Applicant: NTN CORPORATION, Osaka (JP)

(72) Inventors: Yoshinori Ito, Aichi (JP); Yuta Ohashi, Aichi (JP)

(73) Assignee: NTN CORPORATION, Osaka (JP)

(*) Notice: Subject to any disclaimer, the term of this patent is extended or adjusted under 35 U.S.C. 154(b) by 208 days.

(21) Appl. No.: 15/533,738

(22) PCT Filed: Dec. 1, 2015

(86) PCT No.: PCT/JP2015/083685
§ 371 (c)(1),
(2) Date: Jun. 7, 2017

(87) PCT Pub. No.: WO2016/104067
PCT Pub. Date: Jun. 30, 2016

(65) Prior Publication Data
US 2017/0328406 A1 Nov. 16, 2017

(30) Foreign Application Priority Data

Dec. 26, 2014 (JP) .................................. 2014-265247

(51) Int. Cl.
*F16C 33/12* (2006.01)
*F02M 26/74* (2016.01)
(Continued)

(52) U.S. Cl.
CPC .......... *F16C 33/121* (2013.01); *C22C 1/0425* (2013.01); *C22C 9/01* (2013.01);
(Continued)

(58) Field of Classification Search
CPC ................................ C22C 1/0425; C22C 9/01
See application file for complete search history.

(56) References Cited

U.S. PATENT DOCUMENTS 6,132,486 A * 10/2000 Dixon ................... B22F 3/1007
419/27
2005/0118044 A1 6/2005 Inoue et al.
(Continued)

FOREIGN PATENT DOCUMENTS

JP        10-54474       2/1998
JP        2005-48285     2/2005
(Continued)

OTHER PUBLICATIONS

International Preliminary Report on Patentability and Written Opinion of the International Searching Authority dated Jun. 27, 2017 in corresponding International (PCT) Application No. PCT/JP2015/083685.
(Continued)

*Primary Examiner* — Jenny R Wu
(74) *Attorney, Agent, or Firm* — Wenderoth, Lind & Ponack, L.L.P.

(57) ABSTRACT

Provided is a sintered bearing, including Al, Cu, and Ni, the sintered bearing having Al—Cu—Ni alloy structures (3) sintered together. The Al—Cu—Ni alloy structures (3) each have an Al—Ni matrix phase (α-phase) and an Al—Ni compound phase (κ-phase), and are free of an Al—Cu compound phase (γ-phase).

15 Claims, 5 Drawing Sheets

(51) Int. Cl.
   *F16C 33/10*    (2006.01)
   *C22C 9/01*     (2006.01)
   *F04D 29/046*   (2006.01)
   *C22C 1/04*     (2006.01)

(52) U.S. Cl.
   CPC ........... *F02M 26/74* (2016.02); *F04D 29/046* (2013.01); *F16C 33/1095* (2013.01); *F16C 33/128* (2013.01); *F16C 2202/52* (2013.01); *F16C 2204/10* (2013.01); *F16C 2204/20* (2013.01); *F16C 2220/20* (2013.01); *F16C 2360/00* (2013.01); *F16C 2360/22* (2013.01); *F16C 2361/91* (2013.01)

(56) References Cited

U.S. PATENT DOCUMENTS

| | | | | |
|---|---|---|---|---|
| 2006/0219328 A1* | 10/2006 | Grohbauer | ................ | C23F 1/18 148/435 |
| 2007/0269307 A1 | 11/2007 | Kobayashi | | |
| 2010/0111710 A1 | 5/2010 | Hanai et al. | | |
| 2015/0064045 A1* | 3/2015 | Jinnou | ................. | F16C 33/145 419/11 |

FOREIGN PATENT DOCUMENTS

| | | |
|---|---|---|
| JP | 2007-309158 | 11/2007 |
| JP | 2009-7650 | 1/2009 |
| JP | 2010-110152 | 5/2010 |
| JP | 2012-237240 | 12/2012 |
| JP | 2013-216972 | 10/2013 |
| JP | 2014-190333 | 10/2014 |
| WO | 2004/073145 | 8/2004 |

OTHER PUBLICATIONS

International Search Report dated Mar. 8, 2016 in International Application No. PCT/JP2015/083685.
Notification of Reasons for Revocation issued Mar. 3, 2020 in corresponding Japanese Patent Application No. 2014-265247, with English-language translation.
Fukuda Metal Foil & Powder Co., Ltd., Catalog, May 1999, p. 3.
"Powder Properties Illustration (enlarged and revised edition)" edited by Association of Powder Process Industry and Engineering, Society of Powder Technology of Japan, 1st edition, Nikkei Gijutsu Tosho Kabushiki Kaisha, Dec. 21, 1985), p. 159.
"Sintered Machine Parts—the design and manufacture", written and edited by Japan Powder Metallurgy Association, 1st edition, Kabushiki Kaisha Gijutsu Shoin, Oct. 20, 1987, Data 23.
Hoganas brochure, issued by Hoganas AB, Feb. 2011.

* cited by examiner

SINTERED BEARING

TECHNICAL FIELD

The present invention relates to a sintered bearing, and more particularly, to an Al—Cu alloy (also called aluminum bronze)-based sintered bearing.

BACKGROUND ART

Quality of gasoline, gas oil, or the like to be used as a fuel of an engine varies from region to region in the world, and an inferior fuel (e.g., gasoline or gas oil), a biofuel, or the like is used in some cases. A bearing to be arranged in a site that may be brought into contact with such fuel (e.g., in an electric fuel pump or an EGR valve) is required to have corrosion resistance against a sulfide and an organic acid contained in the inferior fuel or the biofuel.

Meanwhile, along with downsizing and lightweighting of the engine, the electric fuel pump or the like is also required to be downsized and lightweighted, and the bearing to be incorporated into the electric fuel pump or the like is also required to be downsized. For example, in the electric fuel pump, in order to achieve downsizing while securing discharge performance, the number of rotations needs to be increased. A bearing configured to support a shaft rotating at such high speed is required to have corrosion resistance and wear resistance (low-friction characteristic) as well as to be downsized.

For example, a copper-based sintered bearing is known as a bearing excellent in wear resistance. However, when the copper-based sintered bearing is brought into contact with the sulfide or the organic acid contained in the inferior fuel or the biofuel, its copper is liable to be corroded. For example, when the copper-based sintered bearing is brought into contact with the sulfide, there is a risk in that copper sulfide may be generated on a surface (in particular, a bearing surface) thereof to reduce a clearance between the bearing surface and a shaft, resulting in an increase in rotation torque. In addition, when the copper-based sintered bearing is brought into contact with the organic acid, its copper is eluted, and hence there is a risk in that its wear resistance may be lower, leading to a shorter product life. As described above, the copper-based sintered bearing is excellent in wear resistance, but is poor in corrosion resistance. Accordingly, the copper-based sintered bearing is not suited for an application in which the copper-based sintered bearing is brought into contact with the inferior fuel or the biofuel.

For example, in Patent Literature 1, there is disclosed an Al—Cu alloy-based sintered bearing. The Al—Cu alloy-based sintered bearing is excellent in sliding property, and is also excellent in corrosion resistance because an aluminum oxide film is generated on its surface.

CITATION LIST

Patent Literature 1: JP 2009-7650 A

SUMMARY OF INVENTION

Technical Problem

In Patent Literature 1, there is disclosed a technology involving adjusting the blending ratio of each component of an Al—Cu alloy-based sintered bearing. However, even when such technology is applied, it cannot be said that corrosion resistance is sufficiently enhanced. Accordingly, there is a need for further investigation.

In view of the above-mentioned circumstances, an object of the present invention is to enhance the corrosion resistance of an Al—Cu alloy-based sintered bearing.

Solution to Problem

In order to achieve the above-mentioned object, according to one embodiment of the present invention, there is provided a sintered bearing, comprising Al, Cu, and Ni, the sintered bearing having Al—Cu—Ni alloy structures sintered together, wherein the Al—Cu—Ni alloy structures each have an Al—Cu—Ni matrix phase and an Al—Ni compound phase, and are free of an Al—Cu compound phase.

When Ni is blended into the Al—Cu alloy-based sintered bearing to precipitate the Al—Cu—Ni matrix phase (solid solution alloy phase) in each of the alloy structures as described above, the corrosion resistance improves. In this case, in the Al—Cu—Ni alloy structures, not only the matrix phase, but also a compound phase having corrosion resistance lower than that of the matrix phase is generally precipitated. Specifically, the Al—Cu compound phase has particularly low corrosion resistance, and the Al—Ni compound phase has corrosion resistance higher than that of the Al—Cu compound phase. Therefore, when the components of raw material powder and their blending ratio are adjusted so that the Al—Cu compound phase particularly poor in corrosion resistance may not be precipitated and the Al—Ni compound phase having relatively excellent corrosion resistance may be precipitated in the Al—Cu—Ni alloy structure, a sintered bearing having extremely excellent corrosion resistance can be obtained.

The composition of the sintered bearing comprises, for example, 7 mass % to 11 mass % of Al and 1 mass % to 6 mass % of Ni, the balance containing Cu as a main component.

In addition, in the sintered bearing, also when Si is blended in place of Ni, an effect similar to that in the above-mentioned case can be obtained. That is, the above-mentioned object can be achieved with a sintered bearing, comprising Al, Cu, and Si, the sintered bearing having Al—Cu—Si alloy structures sintered together, wherein the Al—Cu—Si alloy structures each have an Al—Cu—Si matrix phase and an Al—Si compound phase, and are free of an Al—Cu compound phase. The composition, of the sintered bearing comprises, for example, 7 mass % to 11 mass % of Al and 1 mass % to 6 mass % of Si, the balance containing Cu as a main component.

Further, in the sintered bearing, also when Zn Is blended in place of Ni, an effect similar to that in the above-mentioned case can foe obtained. That is, the above-mentioned object can be achieved with a sintered bearing, comprising Al, Cu, and Zn, the sintered bearing having Al—Cu—Zn alloy structures sintered together, wherein the Al—Cu—Zn alloy structures each have an Al—Cu—Zn matrix phase and an Al—Zn compound phase, and are free of an Al—Cu compound phase. The composition of the sintered bearing comprises, for example, 7 mass % to 11 mass % of Al and 1 mass % to 5 mass % of Zn, the balance containing Cu as a main component.

Incidentally, a sulfide is liable to adhere to pure copper, and hence when a pure copper structure (Cu phase) is present in a sintered, bearing, sulfidation corrosion is liable to occur owing to the adhesion of the sulfide to the Cu phase. Accordingly, when the raw material for the sintered bearing contains pure copper powder, it is necessary that the Cu phase be alloyed by diffusing Al thereinto, leading to an increase in cost of a sintering step. Therefore, the raw material powder for the sintered bearing is preferably free of pure copper powder.

When the sintered bearing as described above has free graphite exposed on a bearing surface thereof, its lubricity and wear resistance can be improved by virtue of the self-lubricity of the free graphite.

A bearing configured to support the rotation of a shaft arranged in a fuel pump, or a bearing configured to support axial-direction reciprocating motion of a valve arranged in an EGR valve is brought into contact with a sulfide or an organic acid contained in a fuel or the like, and hence is required to have excellent corrosion resistance. The above-mentioned sintered bearing can be suitably used as the bearing to be used in such application.

Advantageous Effects of Invention

As described above, according to the present invention, the corrosion resistance of the Al—Cu alloy-based sintered bearing can be enhanced.

DESCRIPTION OF EMBODIMENTS

Figure 1:
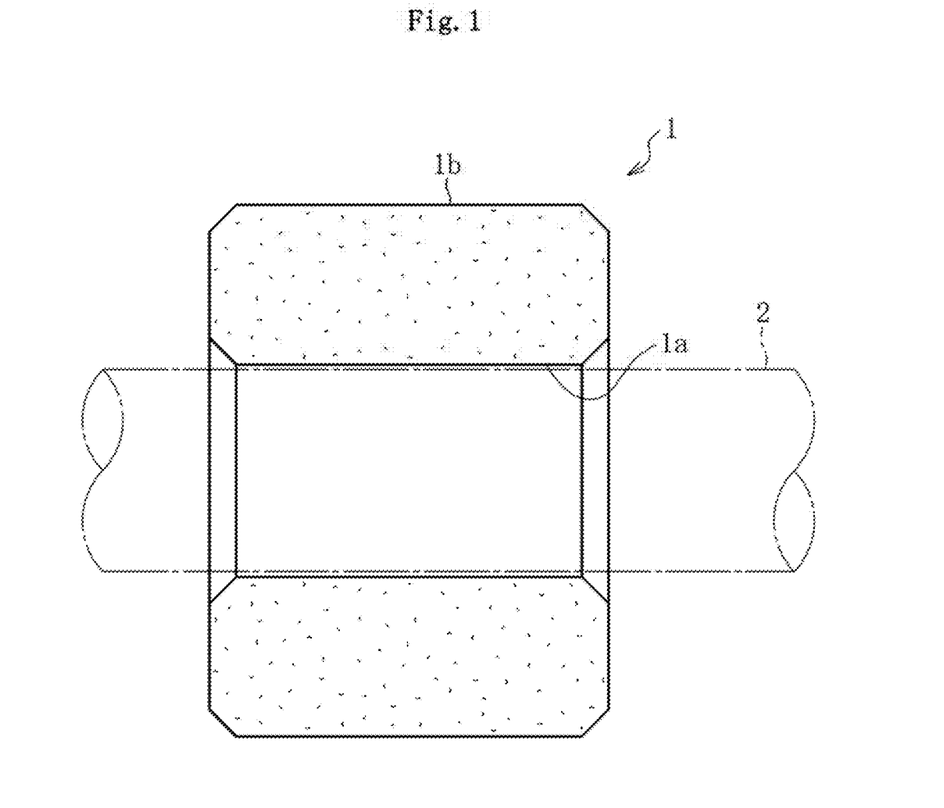
FIG. 1 is a cross-sectional view of a sintered bearing according to an embodiment of the present invention.

As illustrated in FIG. 1, a sintered bearing 1 according to one embodiment of the present invention has a cylindrical shape, and a shaft 2 is inserted into an inner periphery thereof. An inner peripheral surface 1a of the sintered bearing 1 is a cylindrical, surface, and functions as a bearing surface configured to slidingly support an outer peripheral surface of the shaft 2. An outer peripheral surface 1b of the sintered bearing 1 is a cylindrical surface, and functions as a mount surface to be mounted to another member.

The sintered bearing 1 is formed of a sintered metal, in particular, an Al—Cu alloy-based sintered metal. In this embodiment, the sintered bearing 1 is formed of a sintered metal containing Al, Cu, and Ni. Specifically, the sintered bearing 1 comprises, for example, 7 mass % to 11 mass % of Al and 1 mass % to 6 mass % of Ni, the balance containing Cu as a main component. In this embodiment, the sintered bearing 1 comprises, in addition to the above-mentioned components, 3 mass % to 6 mass % of graphite (free graphite) and 0.1 mass % to 0.4 mass % of P with respect to 100 mass % of the total of Al, Cu, and Ni, In this embodiment, the sintered bearing 1 comprises 8.5 mass % of Al and 5 mass % of Ni, the balance containing Cu as a main component.

Figure 2:
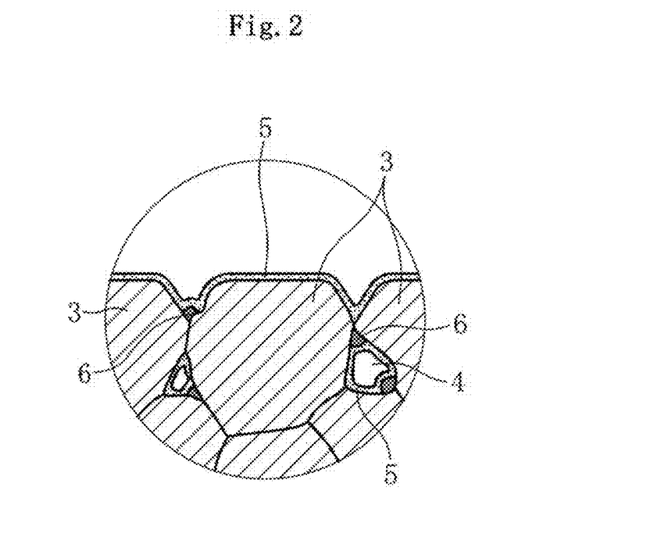
FIG. 2 is an enlarged, cross-sectional view of the sintered bearing.

As illustrated in an enlarged view of FIG. 2, the sintered bearing 1 has Al—Cu—Ni alloy structures 3, and the Al—Cu—Ni alloy structures 3 adjacent to each other are bound together by sintering. Numerous internal pores 4 are formed between the Al—Cu—Ni alloy structures 3. The internal pores 4 communicate to a surface of the sintered bearing 1. Aluminum oxide films 5 are formed on surfaces of the Al—Cu—Ni alloy structures 3, that is, the surface of the sintered bearing 1 including the inner peripheral surface 1a (bearing surface), and around the internal pores 4 of the sintered bearing 1. The Al—Cu—Ni alloy structures 3 are protected with the aluminum oxide films 5, and hence corrosion resistance and wear resistance are enhanced. Free graphite 6 is distributed on the surface of the sintered bearing 1 and inside the sintered bearing 1. Part of the free graphite 6 is exposed on the bearing surface (inner peripheral surface 1a) of the sintered bearing 1. Phosphorus (P) is present (not shown) in grain boundary portions of the Al—Cu—Ni alloy structures 3.

Figure 3:
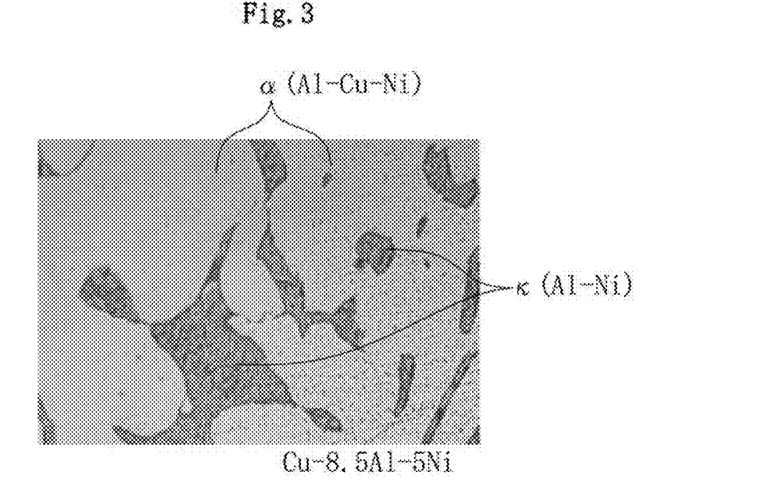
FIG. 3 is an enlarged view of an Al—Cu—Ni alloy structure of the sintered bearing.

FIG. 3 is a further enlarged view of the Al—Cu—Ni alloy structure 3. As shown in FIG. 3, the Al—Cu—Ni alloy structure 3 has Al—Cu—Ni matrix phases (α-phases) and Al—Ni compound phases (κ-phases) while being free of an Al—Cu compound phase (γ-phase). In other words, in an Al—Cu—Ni ternary phase diagram, the composition of the Al—Cu—Ni alloy structure 3 (blending ratio of Al, Cu, and Ni) is set within a range in which the α-phases and the κ-phases are precipitated and no γ-phase is precipitated. When the Al—Cu—Ni matrix phases having extremely high corrosion resistance are precipitated as just described, excellent corrosion resistance can be imparted to the sintered bearing 1. In addition, in the generation of the Al—Cu—Ni alloy structure 3 in the sintered bearing 1, the precipitation of a compound phase poor in corrosion resistance cannot be prevented in practice. However, when, the Al—Cu compound phase having particularly low corrosion resistance as described above is not precipitated and the Al—Ni compound phases having relatively high corrosion resistance are precipitated, the corrosion resistance of the sintered bearing 1 is further enhanced. In this case, the ratio of the Al—Cu—Ni matrix phases in the Al—Cu—Ni alloy structure 3 is preferably high. For example, in terms of area ratio, the ratio is set to 50% or more, preferably 70% or more, and is about 85% in the example shown in FIG. 3.

The density ratio of the sintered bearing 1 is set to fail within the range of from 80% to 95%. In the case where the density ratio of the sintered bearing 1 is less than 80%, its strength becomes insufficient. In the case where the density ratio is more than 95%, its oil-impregnating amount becomes insufficient. Therefore, these oases are not preferred. The density ratio of a surface layer of the sintered bearing 1 is higher than the density ratio of its inside. That is, the porosity in a surface of the sintered hearing 1 (surface opening ratio) is smaller than the porosity in the inside of the sintered bearing 1. In addition, the density ratio of a surface layer of the sintered bearing 1 on the outer peripheral surface 1b side is higher than the density ratio of a surface layer thereof on the inner peripheral surface 1a side. That is, the surface opening ratio in the outer peripheral surface 1b of the sintered bearing 1 is smaller than the surface opening ratio in the inner peripheral surface 1a of the sintered bearing 1. A density ratio α is expressed by the following equation:

$$\alpha(\%) = (\rho 1/\rho 0) \times 100$$

where ρ1 represents the density of a porous body, and ρ0 represents a density when it is assumed that the porous body has no pore.

In addition, the surface layers of the sintered bearing 1 are each defined as a region between the surface of the sintered bearing 1 and a predetermined depth (e.g., a depth of from about 1/100 to about 1/15 of the inner diameter of the sintered bearing 1).

The internal pores of the sintered bearing 1 are impregnated with a lubricating oil. For example, a mineral oil, poly-α-olefin (PAO), an ester, or liquid grease may be used as the lubricating oil. However, the bearing does not necessarily need to be impregnated with the lubricating oil depending on its application, and may be used in a dry state.

When the shaft 2 inserted into the inner periphery of the sintered bearing 1 is subjected to rotation or axial-direction movement, or both of these motions, and the inner peripheral surface 1a of the sintered bearing 1 and the outer peripheral surface of the shaft slide against each other, the lubricating oil regained in the internal pores of the sintered bearing 1 seeps out to the inner peripheral surface 1a along with a temperature increase. The lubricating oil that has seeped out to the inner peripheral surface 1a forms an oil film in a bearing clearance between the inner peripheral surface 1a of the sintered bearing 1 and the outer peripheral surface of the shaft 2, and the shaft 2 is supported by the sintered bearing 1.

Next, a method of manufacturing the sintered bearing 1 is described.

The sintered bearing 1 is formed through: a mixing step of mining various powders to obtain raw material powder; a compacting step of compressing the raw material powder in a die to obtain a green compact; a sintering step of sintering the green compact to obtain a sintered compact; and a sizing step of shaping the sintered compact through compression in a die. Now, each of the steps is described in detail.

[Mixing Step]

In the mixing step, various powders are mixed using a mixer to produce raw material powder. The raw material powder contains powders serving as an Al source, a Cu source, a Ni source, a P source, and a solid lubricant. The raw material powder does not contain pure Cu powder or pure Al powder. In the raw material powder, as necessary, a sintering aid (e.g., aluminum fluoride powder or calcium fluoride powder) or a releasing lubricant (e.g., zinc stearate powder or calcium stearate powder) is further mixed. Now, each of the powders is described in detail.

As each of the Al and Cu sources, for example, Al—Cu—Ni alloy powder or Al—Cu alloy powder may be used. As the Ni source, for example, Al—Cu—Ni alloy powder or Cu—Ni alloy powder may be used. In this embodiment, Al—Cu—Ni alloy powder (prealloyed powder) is used as each of the Al, Cu, and Ni sources. The Al—Cu—Ni alloy powder contains 7 mass % to 11 mass % of Al. The Al—Cu—Ni alloy powder to be used may be, for example, manufactured by an atomizing method. The Al—Cu—Ni alloy powder has a particle diameter of 106 μm or less, and a mean particle diameter of from 20 μm to 50 μm. The mean particle diameter means the mean of particle diameters measured by laser diffraction. Specifically, the mean particle diameter refers to the mean of the particle diameters of 5,000 particles of the powder measured by laser diffraction with SALD-3100 manufactured by Shimadzu Corporation (the same applies hereinafter).

As the P source, P alloy powder may be used. As the P alloy powder, for example, P—Cu alloy powder may be used. In this embodiment, 7 mass % to 10 mass % P—Cu alloy powder was used. P has an enhancing effect on wettability between solid and liquid phases during sintering. When the amount of a P component is excessively small, the accelerating effect on sintering between solid and liquid phases is poor. Meanwhile, when the amount of the P component is excessively large, the sintering excessively progresses to such a degree that Al is liable to be segregated. Therefore, the blending amount of the P alloy powder is set so that, for example, the P component may account for from 0.1 mass % to 0.6 mass %, preferably from 0.1 mass % to 0.4 mass % with respect to 100 mass % of the total of Al, Cu, and Ni in the raw material powder.

As the solid lubricant, for example, graphite powder may be used. The graphite powder is mainly present as free graphite in the pores of the sintered bearing 1 and on its surface. In particular, graphite powder exposed on the bearing surface (inner peripheral surface 1a) imparts excellent lubricity to the sintered bearing 1, and contributes to the improvement of its wear resistance. The blending amount of the graphite powder is set to, for example, from 3 mass % to 6 mass % with respect to 100 mass % of the total of Al, Cu, and Ni in the raw material powder. When the blending amount of graphite is less than 3 mass %, the improving effects of the addition of graphite on lubricity and wear resistance are not obtained. Meanwhile, when the blending amount of graphite is more than 6 mass %, there is, for example, a concern that the diffusion of Al into Cu may start to be inhibited. When the blending amount of graphite is more than 10 mass %, material strength lowers and the diffusion of Al into Cu is inhibited, and hence such blending amount is not preferred. In general, when graphite is added at 4 mass % or more with respect to the main components of the raw material powder, its molding becomes difficult, but the use of granulated graphite as the graphite powder enables the molding. In this embodiment, for the graphite powder, fine powder of natural graphite or artificial graphite was granulated with a resin binder and then pulverised, and graphite powder having a particle diameter of 145 mesh or less was used.

Aluminum fluoride and calcium fluoride each function as the sintering aid. Specifically, aluminum fluoride and calcium fluoride are gradually evaporated while being melted, at the sintering temperature of the Al—Cu—Ni alloy powder, which is from 850° C. to 900° C., protect the surface of the Al—Cu—Ni alloy powder and suppress the generation of aluminum oxide, to thereby accelerate sintering and promote the diffusion of aluminum. Aluminum fluoride and calcium fluoride are evaporated or volatilized during sintering, and hence hardly remain in the sintered bearing 1 as a finished product. Aluminum fluoride and calcium fluoride are preferably added at a total of from about 0.05 mass % to about 0.2 mass % with respect to 100 mass % of the total of Al, Cu, and Ni in the raw material powder. When aluminum fluoride and calcium fluoride are added at less than 0.05 mass %, their effect as the sintering aid is insufficient, and a sintered compact that is dense and has high strength is not obtained. Meanwhile, when aluminum fluoride and calcium fluoride are added at more than 0.2 mass %, their effect as the sintering aid does not increase any more even when the addition amount is increased, and hence the addition amount is preferably kept at 0.2 mass % or less from the viewpoint of cost.

If not particularly necessary, one kind or a plurality of kinds of the P alloy powder, the sintering aid, such as aluminum fluoride and calcium fluoride, the solid lubricant, such as graphite powder, and the releasing lubricant, such as zinc stearate, may not be blended into the raw material powder.

[Compacting Step]

In the compacting step, the raw material powder is filled into a compacting die and compressed to form a green compact having substantially the same shape as the sintered bearing 1. In this embodiment, the raw material powder that has been filled into the compacting die is compressed with a pressing force of from 200 MPa to 700 MPa to mold the green compact. The green compact may be molded under a state in which the compacting die is heated to 70° C. or more.

In the sintered bearing 1 according to this embodiment, the Al source is formed only of the Al—Cu—Ni alloy powder, and the raw material powder does not contain pure Al powder. With this, degradation of the flowability of the raw material powder due to pure Al powder having small specific gravity, and a problem with handling caused by scattering of pure Al particles are eliminated. Thus, the filling property of the raw material powder into the compacting die is enhanced, and hence lowering of moldability and a lack of strength of the green compact can be avoided.

[Sintering Step]

In the sintering step, the green compact is heated at a predetermined sintering temperature to bind adjacent raw material powders together by sintering, to thereby form a sintered compact. The sintering step is performed using, for example, a mesh-belt type continuous furnace. When the queen compact is heated, adjacent Al—Ni—Cu alloy powders (Al—Cu—Ni alloy structures) are bound together by sintering (diffusion joining) to form the sintered compact. At this time, the P component contained in the raw material powder accelerates the sintering of the Al—Cu—Ni alloy structures together to enhance the strength of the sintered compact. In addition, the graphite powder in the raw material powder remains as free graphite inside the sintered compact and on its surface.

In the Al—Cu—Ni alloy structures of the sintered compact thus obtained, Al—Cu—Ni matrix phases ($\alpha$-phases) and Al—Ni compound phases ($\kappa$-phases) are precipitated whereas no Al—Cu compound phase ($\gamma$-phase) is precipitated (see FIG. 2). When the components of the raw material powder and their blending ratio are set so that such alloy structures may be obtained, extremely excellent corrosion resistance is obtained. Specifically, the sintered compact as described above may be obtained by, for example, acquiring an Al—Cu—Ni ternary phase diagram at the sintering temperature in advance, and setting the components and their blending ratio on the basis of the ternary phase diagram so that the structures as described above may be obtained.

The sintering temperature is preferably from 900° C. to 950° C. more preferably from 900° C. to 920° C. In addition, a hydrogen gas, a nitrogen gas, or a mixed gas thereof may be used as an atmosphere gas. As a sintering time is increased, the corrosion resistance improves. In the case of, for example, the sintered bearing 1 to be used for a fuel pump, the sintering time is preferably from 20 minutes to 60 minutes (e.g., 30 minutes).

In the Al—Cu—Ni alloy powder, various liquid phases are generated at a eutectic temperature of 548° C. or more. When the liquid phases are generated, the green compact expands, and the generated liquid phases form a sintering neck. After that, the green compact achieves densification and shrinks, to thereby provide a sintered compact. At this time, in a surface layer of the sintered compact, the Al—Cu—Ni alloy structures are oxidized to inhibit the sintering. Accordingly, the densification is not achieved and dimensions remain expanded, and hence there is a concern of the lack of strength of the sintered compact. However, inside the sintered compact, the Al—Cu—Ni alloy structures are hardly oxidized and are sufficiently sintered, and hence the strength of the sintered compact can be sufficiently secured.

[Sizing Step]

In the sizing step, the sintered compact that has expanded through the sintering is subjected to dimension shaping through compression. Specifically, under a state in which a core rod is inserted into an inner periphery of the sintered compact, and in which the axial-direction width of the sintered compact is regulated to a predetermined dimension with upper and lower punches, the sintered compact, the core rod, and the upper and lower punches are integrally press-fitted to an inner periphery of a die. As a result, the outer peripheral surface of the sintered compact is molded by being pressed with the die, and at the same time, the inner peripheral surface of the sintered compact is molded by being pressed against an outer peripheral surface of the core rod. Through the sizing step, a surface layer of the sintered compact that has expanded is compressed, and the density of the surface layer becomes larger than the density of the inside. In addition, a surface layer of the sintered compact on an outer peripheral surface side has a larger compression amount than that of a surface layer thereof on an inner peripheral surface side, and hence the density of the surface layer on the outer peripheral surface side becomes larger than the density of the surface layer on the inner peripheral surface side. After the sizing step, the inner peripheral surface 1a of the sintered compact may be further subjected to rotation sizing to further decrease the sizes of pores opening on the inner peripheral surface 1a (bearing surface).

[Oil-Impregnating Step]

In the oil-impregnating step, internal pores of the sintered compact are impregnated with a lubricating oil. Specifically, the sintered compact is immersed in the lubricating oil under a reduced-pressure environment, and then returned to normal pressure, with the result that the internal pores of the sintered compact are impregnated with the lubricating oil. Thus, the sintered bearing 1 is finished.

Figure 4:
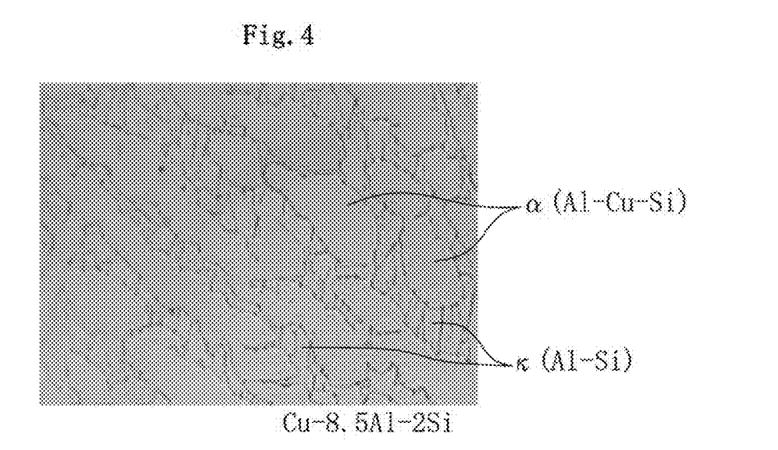
FIG. 4 is an enlarged view of an Al—Cu—Si alloy structure of a sintered bearing according to another embodiment of the present invention.

The present invention is not limited to the above-mentioned embodiment. For example, the composition of the sintered bearing 1 is not limited to the foregoing, and Si may be blended in place of Ni in the above-mentioned embodiment. Specifically, for example, the composition of the sintered bearing may comprise 7 mass % to 11 mass % of Al and 1 mass % to 6 mass % of Si, the balance containing Cu as a main component. In FIG. 4, an Al—Cu—Si alloy structure of a sintered bearing; comprising 8.5 mass % of Al and 2 mass % of Si, the balance containing Cu as a main component is shown. In the Al—Cu—Si alloy structure, Al—Cu—Si matrix phases ($\alpha$-phases) and Al—Si compound phases ($\kappa$-phases) are precipitated, but no Al—Cu compound phase ($\gamma$-phase) is precipitated. The ratio of the Al—Cu—Si matrix phases in the Al—Cu—Si alloy structure is set to, for example, in terms of area ratio, 50% or more, preferably 70% or more, and is about 75% in the example shown in FIG. 4. The other components, a manufacturing method, and the like are similar to those in the above-mentioned embodiment, and hence description thereof is omitted.

Figure 5:
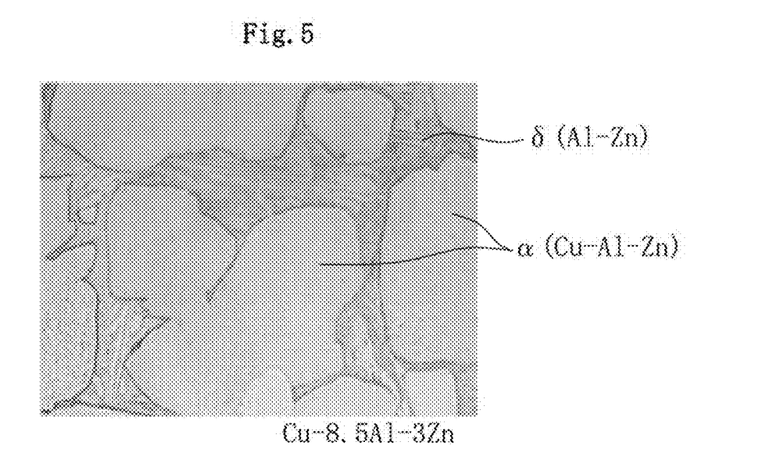
FIG. 5 is an enlarged view of an Al—Cu—Zn alloy structure of a sintered bearing according to another embodiment of the present invention.

In addition, Zn may be blended in place of Ni in the above-mentioned embodiment. Specifically, for example, the composition of the sintered bearing 1 may comprise 7 mass % to 11 mass % of Al and 1 mass % to 5 mass % (preferably 1 mass % to 4 mass %) of Zn, the balance containing Cu as a main component. In FIG. 5, an Al—Cu—Zn alloy structure of a sintered bearing comprising 8.5 mass % of Al and 3 mass % of Zn, the balance containing Cu as a main component is shown. In the Al—Cu—Zn alloy structure, Al—Cu—Zn matrix phases (α-phases) and an Al—Zn compound phase (δ-phase) are precipitated, but no Al—Cu compound phase (γ-phase) is precipitated. The ratio of the Al—Cu—Zn matrix phases in the Al—Cu—Zn alloy structure is set to, for example, in terms of area ratio, 50% or more, preferably 70% or more, and is about 88% in the example shown in FIG. 5. The other components, a manufacturing method, and the like are similar to those in the above-mentioned embodiment, and hence description thereof is omitted.

In addition, Si or Zn, or both thereof may be blended in addition to Ni in the above-mentioned embodiment. In addition, Si and Zn may be blended in place of Ni in the above-mentioned embodiment.

Figure 6:
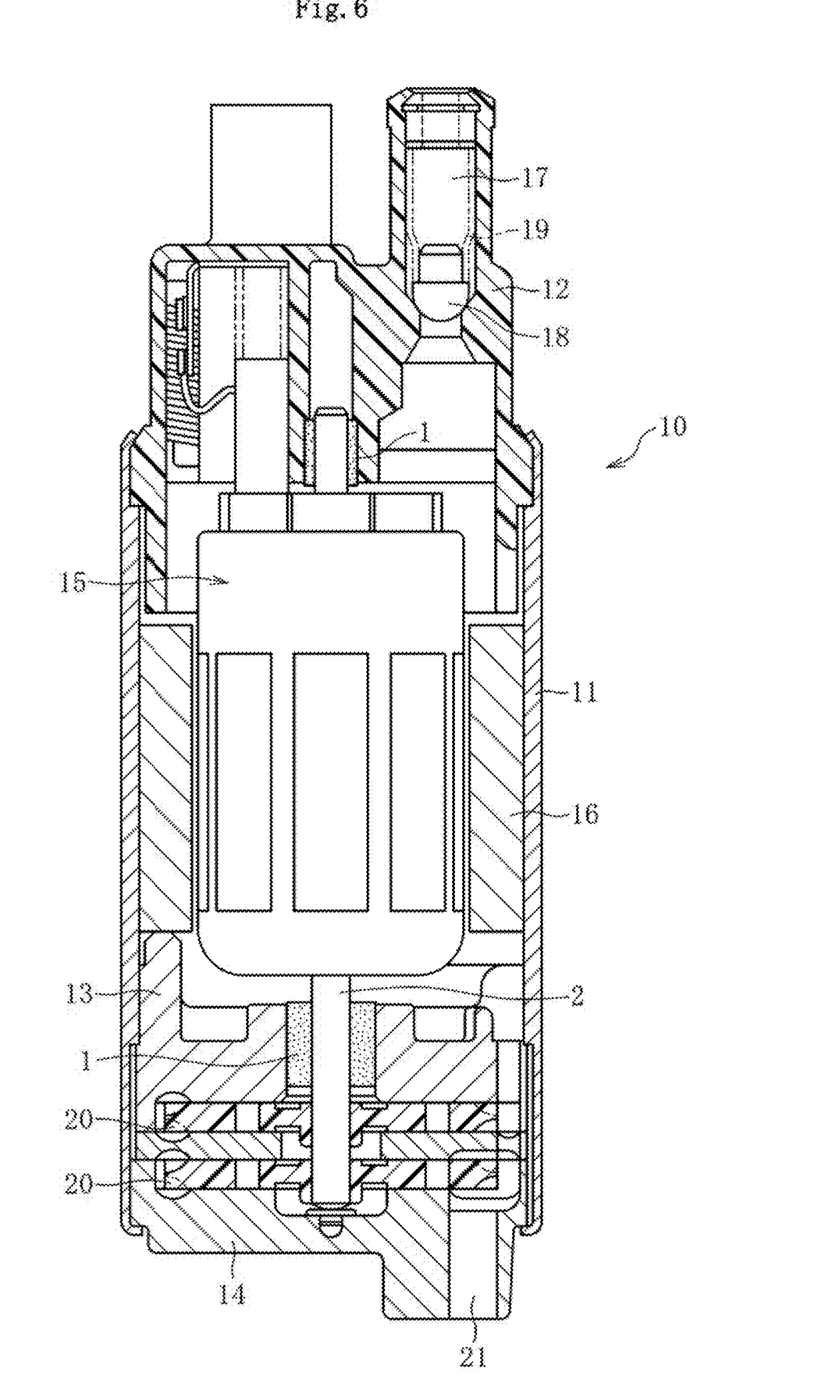
FIG. 6 is a cross-sectional view of a fuel pump.

The sintered bearing 1 is incorporated into, for example, a fuel pump (electric fuel pump 10) illustrated in FIG. 6. The electric fuel pump 10 comprises a substantially cylindrical housing 11 made of a metal, a motor cover 12 fixed to an upper end portion of the housing 11 and made of a synthetic resin, and a pump cover 13 and a pump body 14 each fixed to a lower end portion of the housing 11 and made of a metal.

An armature 15 of a motor is arranged in the housing 11. Both end portions of the shaft 2 arranged in the armature 15 in its axial direction are supported in a rotatable manner by the sintered bearings 1 mounted to the factor cover 12 and the pump cover 13. Internal pores of the sintered bearings 1 are impregnated with a lubricating oil in advance. A magnet 16 is fixed onto an inner peripheral surface of the housing 11, and the magnet 16 and the armature 15 are opposed to each other with a predetermined gap in a radial direction. In the motor cover 12, a discharge port 17 to be connected to a fuel supply pipe (not shown) that communicates to a fuel injection valve is arranged. A check valve 18 configured to prevent a fuel from flowing backward is arranged in the discharge port 17. The check valve 18 is urged with a spring 19 in a closure direction.

Pump impellers 20 are fixed to an end portion of the shaft 2 (lower end in FIG. 6). In the illustrated example, two pump impellers 20 are arranged at two sites that are separated from each other in an axial direction. A suction port 21 is arranged in the pump body 14. When the armature 15 and eight pump impellers 20 are integrally rotated, a fuel in a fuel tank is pumped up through the suction port 21 and passes through the inside of the housing 11 to be discharged from the discharge port 17. The sintered bearings 1 configured to support the shaft 2 in the armature 15 in a rotatable manner are placed under an environment in which the sintered bearings 1 are constantly brought into contact with the fuel (e.g., gasoline).

Figure 7:
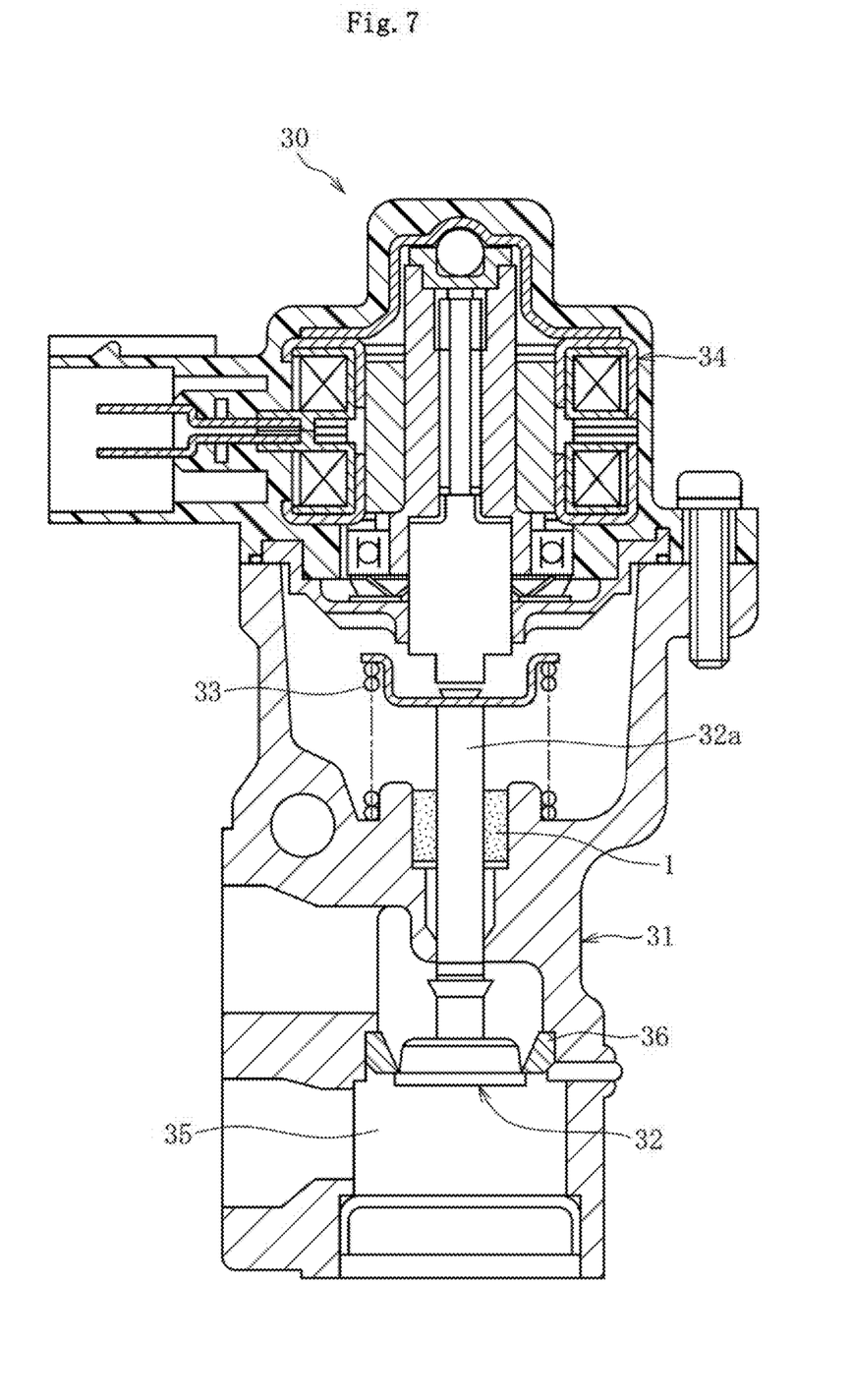
FIG. 7 is a cross-sectional view of an EGR valve.

In addition, the sintered bearing 1 may be incorporated into an EGR valve 30 illustrated in FIG. 7. The EGR valve 30 comprises a housing 31, a valve 32 arranged in the housing 31, a spring 33 configured to urge the valve 32 in a closing direction, and a driving part 34 (e.g., a step motor) configured to drive the valve 32 in an opening direction. A gas flow path 35 is formed in the housing 31, and a valve seat 36 is arranged in the middle of the gas flow path 35. A shaft 32a in the valve 32 is supported to be slidable in its axial direction by the sintered bearing 1 fixed to the housing 31. The sintered bearing 1 does not hot have a lubricating oil impregnated in its internal pores, and is used in a dry state.

Under a state in which the driving part 34 is stopped, the valve 32 is pressed against the valve seat 36 by the urging force of the spring 33, and thus the gas flow path 35 is brought into a closed state. Meanwhile, when the driving part 34 is driven to move the valve 32 downward, the valve 32 is separated from the valve seat 36 to bring the gas flow path 35 into an opened state, and an exhaust gas exhausted from an engine is returned to an inlet side of the engine.

Next, a plurality of test pieces formed of sintered metals having different compositions (Examples 1 to 4 and Comparative Examples 1 to 4) were produced, and were each subjected to a corrosion test. The test pieces had compositions shown in Table 1 below, and were produced by the manufacturing method described above. Now, each of the test pieces is described in detail.

TABLE 1

|  | Al | Ni | Si | Zn | Sn | Cu |
|---|---|---|---|---|---|---|
| Example 1 | 8.5 | 3.0 | — | — | — | Bal. |
| Example 2 | 8.5 | 5.0 | — | — | — | Bal. |
| Example 3 | 8.5 | — | 2.0 | — | — | Bal. |
| Example 4 | 8.5 | — | — | 3.0 | — | Bal. |
| Comparative Example 1 | 8.5 | — | — | 5.0 | — | Bal. |
| Comparative Example 2 | — | 30 to 35 | — | — | — | Bal. |
| Comparative Example 3 | 8.5 | — | — | — | — | Bal. |
| Comparative Example 4 | 8.5 | — | — | — | 3.0 | Bal. |

Al—Cu—Ni-Based Sintered Compacts (Example 1 and Example 2)

The test pieces of Example 1 and Example 2 are each formed of a sintered compact produced using raw material powder containing Al—Cu—Ni alloy powder containing 7 mass % to 11 mass % of Al, and contain 8.5 mass % of Al and 3.0 mass % (Example 1) or 5.0 mass % (Example 2) of Ni, the balance containing Cu as a main component. In an Al—Cu—Ni alloy structure generated in the sintered compact, Al—Cu—Ni matrix phases (α-phases) and Al—Ni compound phases (κ-phases) were found to be precipitated (see FIG. 3). In addition, no Al—Cu compound phase (γ-phase) was found to be precipitated.

Al—Cu—Si-Based Sintered Compact (Example 3)

The test piece of Example 3 is formed of a sintered compact produced using raw material powder containing Al—Cu—Si alloy powder containing 7 mass % to 11 mass % of Al, and contains 8.5 mass % of Al and 2.0 mass % of Si, the balance containing Cu as a main component. In an Al—Cu—Si alloy structure generated in the sintered compact, Al—Cu—Si matrix phases (α-phases) and Al—Si compound phases (κ-phases) were found to be precipitated (see FIG. 4). In addition, no Al—Cu compound phase (γ-phase) was found to be precipitated.

Al—Cu—Zn-Based Sintered Compacts (Example 4 and Comparative Example 1)

The test pieces of Example 4 and Comparative Example 1 are each formed of a sintered compact produced using raw material powder containing Al—Cu—Zn alloy powder containing 7 mass % to 11 mass % of Al, and contain 8.5 mass % of Al and 3.0 mass % (Example 3) or 5.0 mass % (Comparative Example 1) of Zn, the balance containing Cu as a main component. In an Al—Cu—Zn alloy structure generated in the sintered compact, Al—Cu—Zn matrix phases (α-phases) and an Al—Zn compound phase (δ-phase) were found to be precipitated (see FIG. 5). In addition, no Al—Cu compound phase (γ-phase) was found to be precipitated.

Cupronickel-Based Sintered Compact (Comparative Example 2)

The test piece of Comparative Example 2 is forced of a sintered compact produced using raw material powder mainly containing Cu powder and Ni powder, and contains 30 mass % to 35 mass % of Ni.

Al—Cu-Based Sintered Compact (Comparative Example 3)

Figure 8:
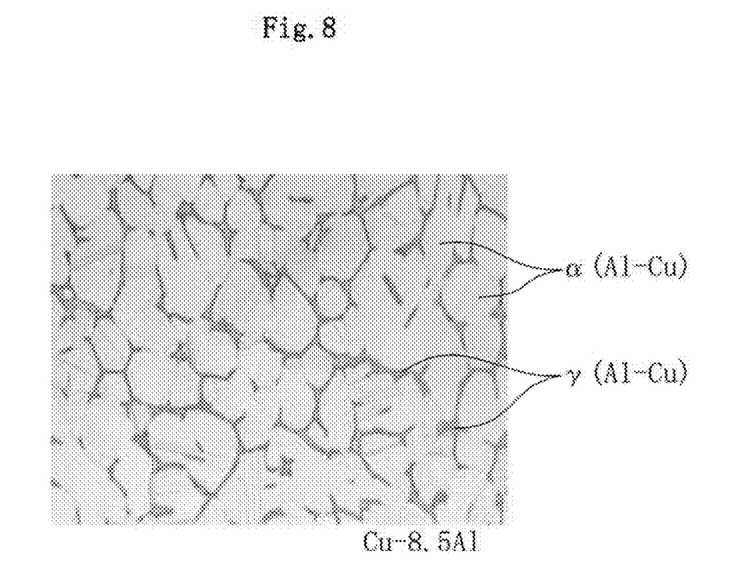
FIG. 8 is an enlarged view of an Al—Cu alloy structure of a test piece according to a comparative example.

The test piece of Comparative Example 3 is formed of a sintered compact produced using raw material powder containing Al—Cu alloy powder containing 7 mass % to 11 mass % of Al, and contains 8.5 mass % of Al, the balance containing Cu as a main component. In an Al—Cu alloy structure generated in the sintered compact, Al—Cu matrix phases (α-phases) and Al—Cu compound phases (γ-phases) were found to be precipitated (see FIG. 8).

Al—Cu—Zn-Based Sintered Compact (Comparative Example 4)

The test piece of Comparative Example 4 is formed of a sintered Compact produced using raw material powder containing Al—Cu alloy powder containing 7 mass % to 11 mass % of Al, and Sn powder, and contains 8.5 mass % of Al and 3.0 mass % of Sn, the balance containing Cu as a main component. In an Al—Cu—Sn alloy structure generated in the sintered compact, Al—Cu—Zn matrix phases (α-phases) and Al—Cu compound phases (γ-phases) were found to be precipitated.

Figure 9:
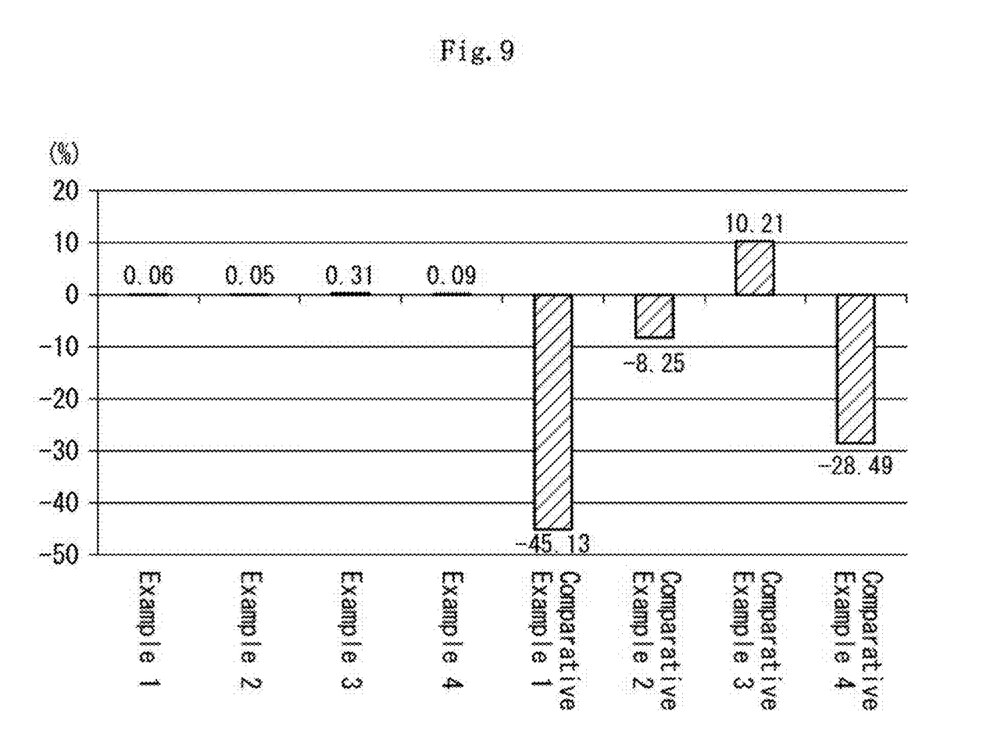
FIG. 9 is a graph for showing the results of a corrosion test.

Each of the test pieces was immersed in a solution containing a sulfide and an organic acid for a predetermined period of time, and was measured for the ratio of a weight change before and after the immersion. As a result, as shown m FIG. 9, in each of Examples 1 to 4, the weight hardly changed before and after the immersion, whereas in each of Comparative Examples 1 to 4, the weight significantly changed before and after the immersion. Specifically, in each of Comparative Examples 1, 2, and 4, the weight significantly reduced through the immersion treatment (Comparative Example 1: −45.13%, Comparative Example 2: −8.25%, Comparative Example 4: −28.49%). This is presumably because an Al component in the sintered compact was dissolved owing to the organic acid in the solution. In addition, in Comparative Example 3, the weight significantly increased through the immersion treatment (+10.21%). This is presumably because the sulfide adhered to the sintered compact. In contrast, in each of Examples 1 to 4, the ratio of the weight change through the immersion treatment was reduced to for extremely small (about less than 0.5%). It was found from those results that each of Examples 1 to 4, in which an appropriate amount of any one of Ni, Si, and Zn was added to the Cu—Al-based sintered compact, had excellent corrosion resistance, in particular, each of Examples 1 and 2 having an Al—Cu—Ni alloy structure had extremely excellent corrosion resistance.

REFERENCE SIGNS LIST 1 sintered bearing
2 shaft
3 Al—Cu—Ni alloy structure
4 internal pore
5 aluminum oxide film
6 free graphite
10 electric fuel pump
30 EGR valve

The invention claimed is:

1. A sintered bearing, comprising Al, Cu, and Ni, the sintered bearing having Al—Cu—Ni alloy structures sintered together, and the sintered bearing having a bearing surface consisting of a molded surface,
  wherein the Al—Cu—Ni alloy structures, which are made of Al—Cu—Ni pre-alloyed powder, each have an Al—Cu—Ni matrix phase and an Al—Ni compound phase, and are free of an Al—Cu compound phase,
  wherein the sintered bearing comprises 7 mass % to 11 mass % of Al and 1 mass % to 6 mass % of Ni, the balance containing Cu as a main component.

2. The sintered bearing according to claim 1, wherein raw material powder for the sintered bearing is free of pure copper powder.

3. The sintered bearing according to claim 1, further comprising free graphite exposed on a bearing surface of the sintered bearing.

4. A fuel pump, comprising:
  the sintered bearing of claim 1;
  a shaft, which is inserted into an inner periphery of the sintered bearing, and is supported by the sintered bearing in a rotatable manner; and
  a pump impeller fixed to the shaft.

5. An EGR valve, comprising:
  the sintered bearing of claim 1; and
  a valve including a shaft, the shaft being inserted into an inner periphery of the sintered bearing and supported to be movable in its axial direction by the sintered bearing.

6. A sintered bearing, comprising Al, Cu, and Si, the sintered bearing having Al—Cu—Si alloy structures sintered together,
  wherein the Al—Cu—Si alloy structures, which are made of Al—Cu—Si pre-alloyed powder, each have an Al—Cu—Si matrix phase and an Al—Si compound phase, and are free of an Al—Cu compound phase,
  wherein the sintered bearing comprises 7 mass % to 11 mass % of Al and 1 mass % to 6 mass % of Si, the balance containing Cu as a main component.

7. The sintered bearing according to claim 6, further comprising free graphite exposed on a bearing surface of the sintered bearing.

8. A fuel pump, comprising:
  the sintered bearing of claim 6;
  a shaft, which is inserted into an inner periphery of the sintered bearing, and is supported by the sintered bearing in a rotatable manner; and
  a pump impeller fixed to the shaft.

9. An EGR valve, comprising:
  the sintered bearing of claim 6; and
  a valve including a shaft, the shaft being inserted into an inner periphery of the sintered bearing and supported to be movable in its axial direction by the sintered bearing.

10. The sintered bearing according to claim 6, wherein raw material powder for the sintered bearing is free of pure copper powder.

11. A sintered bearing, comprising Al, Cu, and Zn, the sintered bearing having Al—Cu—Zn alloy structures sintered together, wherein the Al—Cu—Zn alloy structures, which are made of Al—Cu—Zn pre-alloyed powder, each have an Al—Cu—Zn matrix phase and an Al—Zn compound phase, and are free of an Al—Cu compound phase, wherein the sintered bearing comprises 7 mass % to 11 mass % of Al and 1 mass % to 5 mass % of Zn, the balance containing Cu as a main component.

12. The sintered bearing according to claim 11, further comprising free graphite exposed on a bearing surface of the sintered bearing.

13. A fuel pump, comprising:

the sintered bearing of claim 11;

a shaft, which is inserted into an inner periphery of the sintered bearing, and is supported by the sintered bearing in a rotatable manner; and a pump impeller fixed to the shaft.

14. An EGR valve, comprising:

the sintered bearing of claim 11; and a valve including a shaft, the shaft being inserted into an inner periphery of the sintered bearing and supported to be movable in its axial direction by the sintered bearing.

15. The sintered bearing according to claim 11, wherein raw material powder for the sintered bearing is free of pure copper powder.

* * * * *